(12) United States Patent
Newbold et al.

(10) Patent No.: US 7,493,303 B2
(45) Date of Patent: Feb. 17, 2009

(54) METHOD FOR REMOTELY SEARCHING A LOCAL USER INDEX

(75) Inventors: David L. Newbold, West Roxbury, MA (US); Tolga Oral, Arlington, MA (US); Raudel S. Rodriguez, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 407 days.

(21) Appl. No.: 10/910,640

(22) Filed: Aug. 4, 2004

(65) Prior Publication Data

US 2006/0031198 A1    Feb. 9, 2006

(51) Int. Cl.
    *G06F 7/00*    (2006.01)

(52) U.S. Cl. .............................. 707/2; 707/3

(58) Field of Classification Search ................ 707/1–10
    See application file for complete search history.

(56) References Cited

U.S. PATENT DOCUMENTS

| | | | | |
|---|---|---|---|---|
| 5,982,369 | A | 11/1999 | Sciammarella et al. | 345/349 |
| 5,999,968 | A * | 12/1999 | Tsuda | 709/213 |
| 6,012,053 | A | 1/2000 | Pant et al. | 707/3 |
| 6,026,388 | A | 2/2000 | Liddy et al. | 707/1 |
| 6,041,331 | A | 3/2000 | Weiner et al. | 707/103 |
| 6,243,091 | B1 | 6/2001 | Berstis | 345/349 |
| 6,285,996 | B1 | 9/2001 | Jou et al. | 707/4 |
| 6,295,527 | B1 | 9/2001 | McCormack et al. | 707/3 |
| 6,317,718 | B1 | 11/2001 | Fano | 707/1 |
| 6,473,752 | B1 | 10/2002 | Fleming, III | 707/4 |
| 6,598,054 | B2 | 7/2003 | Schuetze et al. | 707/103 R |
| 6,606,657 | B1 | 8/2003 | Zilberstein et al. | 709/224 |
| 6,631,496 | B1 | 10/2003 | Li et al. | 715/501.1 |
| 6,670,974 | B1 | 12/2003 | McKnight et al. | 345/855 |
| 6,775,665 | B1 | 8/2004 | Piersol | 707/4 |
| 6,823,341 | B1 * | 11/2004 | Dietz | 707/100 |
| 6,889,220 | B2 | 5/2005 | Wolff et al. | 707/1 |
| 6,892,196 | B1 | 5/2005 | Hughes | 707/4 |
| 6,920,608 | B1 | 7/2005 | Davis | 715/503 |
| 7,069,315 | B1 | 6/2006 | Harris | 709/224 |
| 7,076,504 | B1 | 7/2006 | Handel et al. | 707/104.1 |
| 7,092,934 | B1 | 8/2006 | Mahan et al. | 707/3 |
| 7,162,473 | B2 | 1/2007 | Dumais et al. | 707/5 |
| 7,225,187 | B2 | 5/2007 | Dumais et al. | 707/5 |

(Continued)

OTHER PUBLICATIONS

Greg Saitz, "Extreme Internship IBM program allows interns' projects to become products" Star-Ledger, Aug. 7, 2003.

(Continued)

*Primary Examiner*—Wilson Lee
(74) *Attorney, Agent, or Firm*—Pillsbury Winthrop Shaw Pittman LLP

(57) ABSTRACT

A system and method are provided for enabling a user to search for documents that the user has previously viewed on its local machine. The system includes three main components: the desktop integration module, the index module, and the graphical user interface module. The desktop integration module is an application which monitors documents with which the user interacts for predetermined events, and obtains content data and metadata from the monitored documents. The index module indexes the content data and metadata received from the desktop integration module. The graphical user interface module then permits a user to utilize the desktop integration module and index module by allowing a user to search for a document.

18 Claims, 12 Drawing Sheets

U.S. PATENT DOCUMENTS

| | | | |
|---|---|---|---|
| 7,305,381 B1 * | 12/2007 | Poppink et al. | 707/3 |
| 7,395,260 B2 | 7/2008 | Oral et al. | 707/3 |
| 2002/0078035 A1 * | 6/2002 | Frank et al. | 707/1 |
| 2002/0129139 A1 | 9/2002 | Ramesh | 709/224 |
| 2002/0156917 A1 * | 10/2002 | Nye | 709/238 |
| 2003/0033296 A1 | 2/2003 | Rothmuller et al. | 707/3 |
| 2003/0097361 A1 | 5/2003 | Huang et al. | 707/10 |
| 2003/0158839 A1 | 8/2003 | Faybishenko et al. | 707/3 |
| 2003/0158855 A1 | 8/2003 | Farnham et al. | 707/102 |
| 2003/0164856 A1 * | 9/2003 | Prager et al. | 345/764 |
| 2003/0233618 A1 | 12/2003 | Wan | 715/513 |
| 2004/0044658 A1 | 3/2004 | Crabtree et al. | 707/3 |
| 2004/0199491 A1 * | 10/2004 | Bhatt | 707/2 |
| 2004/0249801 A1 | 12/2004 | Kapur | 707/3 |
| 2004/0267700 A1 | 12/2004 | Dumais et al. | 707/2 |
| 2004/0267730 A1 | 12/2004 | Dumais et al. | 707/3 |
| 2005/0027696 A1 | 2/2005 | Swaminathan et al. | 707/3 |
| 2005/0044066 A1 | 2/2005 | Hooper et al. | 707/3 |
| 2005/0055341 A1 * | 3/2005 | Haahr et al. | 707/3 |
| 2005/0086239 A1 | 4/2005 | Swann et al. | 707/100 |
| 2005/0137996 A1 | 6/2005 | Billsus et al. | 707/1 |
| 2005/0138067 A1 * | 6/2005 | Billsus et al. | 707/104.1 |
| 2005/0149858 A1 | 7/2005 | Stern et al. | 715/513 |
| 2005/0165777 A1 | 7/2005 | Hurst-Hiller et al. | 707/4 |
| 2005/0177805 A1 * | 8/2005 | Lynch et al. | 715/968 |
| 2006/0031195 A1 | 2/2006 | Patterson | 707/3 |

OTHER PUBLICATIONS

Cade Metz, "A Glimpse of IBM's Future," PC Magazine, Aug. 11, 2003.

Newbold, et al., "Total Recall" presentation presented during The Extreme Blue Technology Showcase in Armonk, NY on Aug. 5-6, 2003.

Newbold, et al., "Total Recall" poster displayed during The Extreme Blue Technology Showcase in Armonk NY, during the week of Aug. 4, 2003.

Microsoft Computer Dictionary, Microsoft Press, 3$^{rd}$ Edition, copyright 1997, p. 15.

Bell, Gordon, "MyLifeBits: Attempting to Realize the Memex Vision", PowerPoint Presentation, Microsoft Research, Feb. 2003, 48 pages.

Rupley, Sebastian, "Software to Watch Over Me", PC_Mag.com, May 20, 2003, Ziff Davis Media Inc., printed from http://www.pcmag.com/print_article2/0,1217,a%253D41782.00.asp, 1 page.

Kanellos, Michael, "Microsoft Tackles Search Overload", ZDNet News, Apr. 18, 2003, printed from http://news.zdnet.com/2100-3513_22-128830.html, 5 pages.

* cited by examiner

☐ The Source for Java Technology
Tue Jul 01 × × ×
http://java.sun.com/
Number of times Opened: 8
Total Viewing Time: 06:05:30
Last Access: 8/21 4:34PM ☐ Java Search
Tue Jul 01 × × ×
http://search.java.sun.com/search/java/?qt=XML+Tutorial ×
Number of times Opened: 12
Total Viewing Time: 01:09:15
Last Access: 8/05 9:05AM

METHOD FOR REMOTELY SEARCHING A LOCAL USER INDEX

CROSS REFERENCE TO RELATED APPLICATIONS

This application is related to the commonly owned co-pending U.S. patent applications entitled "System and Method for Locating Documents a User has Previously Accessed," U.S. patent application Ser. No. 10/910,607, filed Aug. 4, 2004; "System and Method for Utilizing a Desktop Integration Module to Collect User Metrics," U.S. patent application Ser. No. 10/910,606, filed Aug. 4, 2004; "System and Method for Presenting Multi-Variable Dynamic Search Results Visualizations," U.S. patent application Ser. No. 10/910,568, filed Aug. 4, 2004; "System and Method for Providing a Result Set Visualization of Chronological Document Use," U.S. patent application Ser. No. 10/910,641, filed Aug. 4, 2004; "System and Method for Providing Graphical Representations of Search Results in Multiple Related Histograms," U.S. patent application Ser. No. 10/910,617, filed Aug. 4, 2004; "System and Method for Enhancing Keyword Relevance by User's Interest in the Search Result Document," U.S. patent application Ser. No. 10/910,577, filed Aug. 4, 2004; "System and Method for Displaying Usage Metrics as Part of Search Results," U.S. patent application Ser. No. 10/910,603, filed Aug. 4, 2004; and "System and Method for Automatically Searching for Documents Related to Calendar and Email Entries," U.S. patent application Ser. No. 10/910,604, filed Aug. 4, 2004, each filed herewith and incorporated by reference in its entirety.

FIELD OF THE INVENTION

The invention relates to an application for searching a document that a user has previously viewed on user terminal device.

BACKGROUND OF THE INVENTION

Many programs enable a user to search for documents located on the computer device. For example, a user may be able to search for a document by entering search terms believed to reflect the document's title or by entering search terms believed to be included in the document text. However, conventional document management tools are limited in the amount of search criteria that a user may use to locate a particular desired document.

Often, users only remember, or have access to, small bits of information related to the document for which they are searching, such as, for example, the day and/or approximate time the document was accessed, a broad overview of what the document was about, and/or other details. Users are generally not good at creating search criteria, particularly based on such limited information, and would be better at modifying a search if they were give clues to form a more effective search.

It is an aspect of the invention to assist a user with searching specifically for documents the user has previously accessed by providing criteria that might enable the user to more easily locate a particular desired document.

It is another aspect of the invention to provide a graphical user interface with various features and functions to facilitate the user with locating the document once the search has been performed.

SUMMARY OF THE INVENTION

These and other objects are addressed through various embodiments of the invention. According to one aspect of the invention, a system and method are provided for quickly and efficiently searching for and selectively retrieving one or more documents that a user has previously accessed. The previously accessed documents may or may not be located at the user's local workstation. As used herein, the term documents may refer to files such as, for example, Microsoft Word or Excel documents, email messages, web pages, media files, folders, and/or other files.

The system may include a desktop integration module, an index module, a graphical user interface module, and/or other modules. The desktop integration module may monitor documents with which the user interacts for predetermined events and obtain content data and metadata from the monitored documents. The index module may index the content data and metadata received from the desktop integration module. The graphical user interface module may then permit a user to utilize the index module by allowing a user to search for documents.

The desktop integration module may monitor documents that the user views, edits, creates, or otherwise accesses for predetermined events. For example, the desktop integration module may track each time a user opens a document and each time the user closes the same document, enabling the duration of document interaction to be determined. The desktop integration module may obtain content data, such as keywords, title of the document, author of the document, and/or other control data and metadata determined from the predetermined events for the monitored documents, and transfer the content data and metadata to the index module.

The index module may index parameters that enable the user to search and filter the monitored documents. For each document monitored by the desktop integration module, the index may include parameters such as, for example, the date created, the date opened, the date closed, the date modified, the amount of time spent on a document, the date printed, the date sent, the number of times of document was accessed, and/or other parameters. The index module may also store keywords from the document, the title of the document, and/or the author of the document. These parameters in the index module may be determined from the content data and metadata collected by the desktop integration module. A filter may be provided, enabling user to specify documents that are not to be indexed, such as a default home page or personal email.

The graphical user interface module may enable a user to perform searches of the index created by the index module and therefore locate a document which has been previously accessed by the user. The results reflect documents considered relevant in content based on the search terms and other parameters entered by the user such as, for example, dates and selected applications. The user may browse the search results and/or sort the result set by various criteria for ease of viewing.

According to one aspect of the invention, desktop integration module may include one or more subsystems, such as, for example, application plug-ins, a communications module, a user interaction module, a document filter module, and/or other modules. The desktop integration module may track each instance in which a user enters a URL to access a web page. In some embodiments, the desktop integration module may track web pages that a user visits by accessing a link on a page for which a URL was entered. In other embodiments, the desktop integration module may track an instance where the user opens a Word document or reads an email.

A document filter module may be provided to enable a user to specify documents that should not be monitored or indexed. For example, documents that a user commonly accesses or documents that contain private information such as, for example, online bank account statements or webpages with the "https" protocol may be filtered and not indexed.

Application plugins may extract information from documents such as, for example, document type, content, and/or author. Communications module may be used to queue documents being retrieved from application plugins to the index module. Communications module may also convert documents from their native format, such as, for example, .DOC or .XLS, to a common XML format. User interaction module may interact with application plugins to track the amount of time a user spends interacting with a document.

According to another aspect of the invention, the graphical user interface module may present a graphical user interface having multiple graphical visualizations of a search results set. A calendar may be displayed indicating when a user has accessed a document in the search results set. A document usage histogram may be displayed illustrating all documents that the user has accessed compared to those documents matching the search query.

According to another aspect of the invention, a histogram displayed on a graphical user interface may allow a user to see the context of the result set against their own document usage. Vertical lines may be presented indicating documents that match the search query. The vertical lines may be of varying heights, indicating the relevance of the document to the search query.

According to another aspect of the invention, multiple related histograms may be provided. The histograms may represent the relevance of the search results, as well as the number of documents matching the search criteria for a given day. The histogram may have one axis displaying, for example, dates and times, and another axis displaying, for example, the amount of time spent on a particular document.

According to another aspect of the invention, better search results for specific users may be returned by enhancing the result set rankings according to a specific user's interest in the document. User metrics may be collected during a user's interaction with other documents to enhance keyword relevance rankings. User metrics may include the time spent on a document, frequency with which the document was viewed, whether the document is printed, and/or other metrics. The amount of time a user has spent on a document may be measured if one or more criteria such as, for example, whether the document is in focus and/or whether some type of input has been received relative to the document within a particular time interval, are met.

According to another aspect of the invention, historical data related to a user's interaction with a document may be provided with a search results set. This may allow a user to more readily distinguish between documents in the results set.

A user may view metrics obtained by the desktop integration module by performing a triggering action, for example, by right-clicking on a document in the results set or other triggering action. Performing the triggering action may cause the calendar and histogram views to change, reflecting the additional information.

According to one aspect of the invention, the search system may be embedded into a user's calendar and/or email application. The user may then generate search queries by performing a triggering action on a selected calendar or email entry. The search query may include, for example, the title of a meeting, meeting attendees, dates, keywords in the body of the calendar or email entry, and/or other query options.

According to another aspect of the invention, a system and method may be provided, enabling users to search a local workstation from an enterprise portal. This may enable the user to search their local workstation as well as other document management systems simultaneously. An index control program and a web responder may be downloaded to a user's workstation. Documents may then be indexed at the user workstation and inbound query requests by an enterprise portal server may be accepted.

A user may perform a search of their workstation through an enterprise portal. The search query may be processed at the local workstation and results may be returned in a format compatible with the enterprise server.

Other objects and features of the invention will become apparent from the following detailed description considered in connection with the accompanying drawings. The drawings are designed for purposes of illustration only and the invention is not limited to the particulars shown therein. Various alternatives and modifications within the scope of the invention will be apparent from the description contained herein.

BRIEF DESCRIPTION OF THE DRAWINGS

FIG. 10 illustrates a results set listing, according to an embodiment of the invention.

DETAILED DESCRIPTION OF PREFERRED EMBODIMENTS

Figure 1:
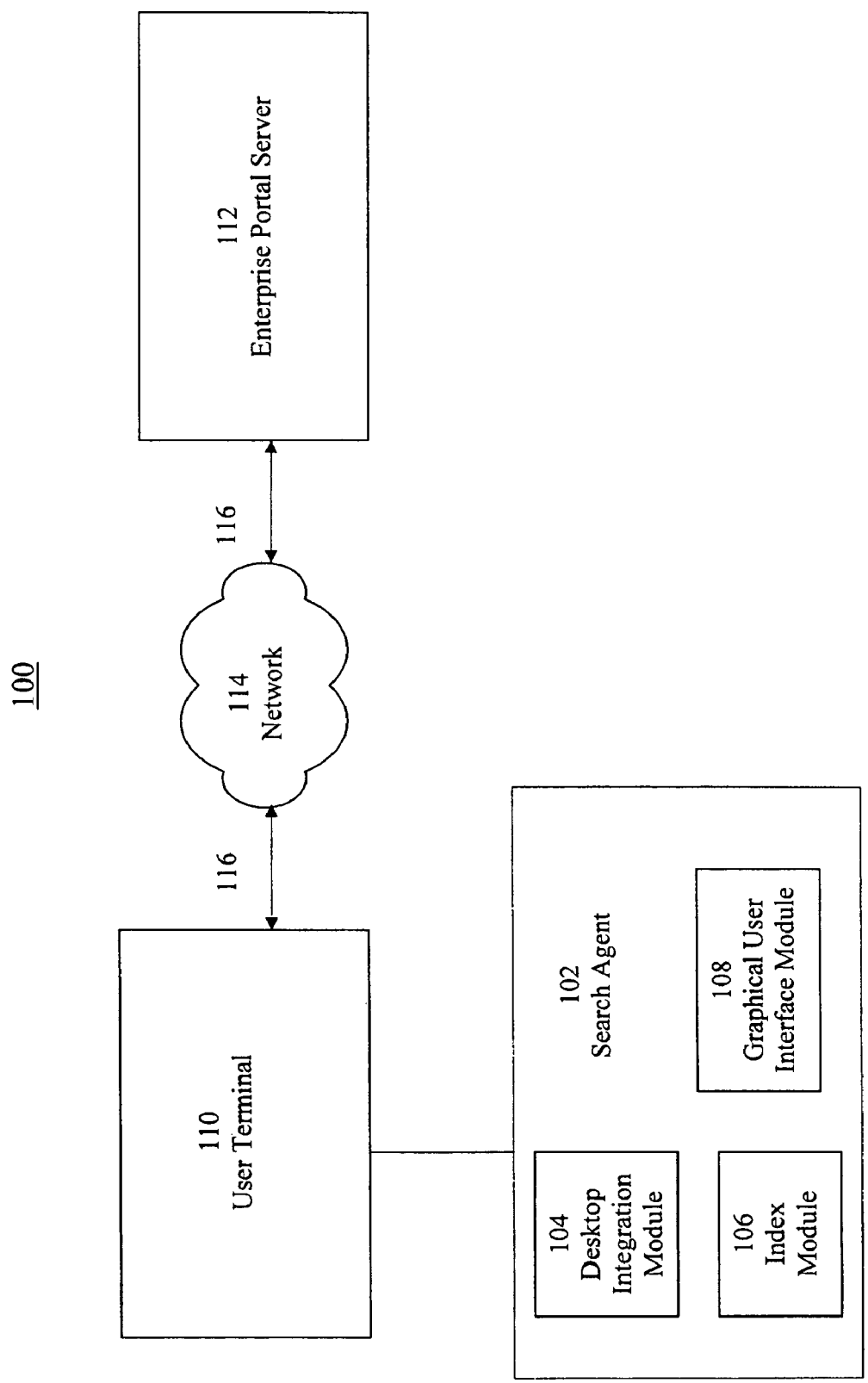
FIG. 1 is a block diagram illustrating a system for searching for previously accessed documents, according to an embodiment of the invention.

According to one embodiment of the invention, a system 100 may be provided enabling a user to search for and/or selectively retrieve documents that the user has previously accessed. FIG. 1 is a block diagram of system 100, according to an embodiment of the invention. A search agent 102 may be provided. Search agent 102 may include one or more modules such as, for example, a desktop integration module 104, an index module 106, a graphical user interface module 108, and/or other modules. Search agent 102 may be located at a user terminal 110. In some embodiments, certain modules such as, for example, index module 104 may be implemented at user terminal 110, while other modules may be implemented at user terminal 110 or remotely. Other variations may be used, as would be apparent.

User terminal 110 may include any one or more of: for example, a desktop computer, a laptop or other portable computer, a hand-held computer device such as a Blackberry, a Personal Digital Assistant (PDA), and/or any other terminal device. User terminal device 110 may be connected to an enterprise portal server 112 over a network 114 via a communications link 116.

Server 112 may enable a user to remotely search for documents the user has accessed, even if these documents are stored at the user's terminal device. Server 112 may be or include, for example, a workstation running Microsoft Windows™ NT™, Unix, Linux, Novell Netware™, and/or other operating systems. Network 114 may include any one or more networks, such as, for example, the Internet, an intranet, a Local Area Network (LAN), and/or other networks. Communications link 116 may include any one or more communications links such as, for example, a copper telephone line, a Digital Subscriber Line (DSL) connection, an Ethernet connection, an Integrated Services Digital Network (ISDN) line, a wireless connection, or other communications link.

Desktop integration module 104 may be provided to monitor documents accessed by a user for predetermined events. Desktop integration module 104 may monitor any document that the user views, edits, creates, prints, downloads, or otherwise accesses. These predetermined events may be or include, for example, opening a document, closing a document, printing a document, emailing a document, and/or other predetermined events.

Index module 106 may receive data from desktop integration module 104 and put the data into a format that may be searched by a user using a graphical user interface. Index module 106 may enable a user to filter search results by, for example, a date or date range, a document type, and/or other parameters. A user may specify certain documents that should not be indexed, such as, for example, a default homepage or a search index. Graphical user interface module 108 may provide a graphical user interface (GUI) that enables a user to search for a previously accessed document.

A user may initiate a query from a search portlet located on the user's portal page by using a traditional keyword search terms. The portal software may then direct the query to index module 106 and search results may be presented to the user in a new graphical user interface. A graphical user interface for displaying search results and modifying a search is described in detail hereinafter.

Figure 2:
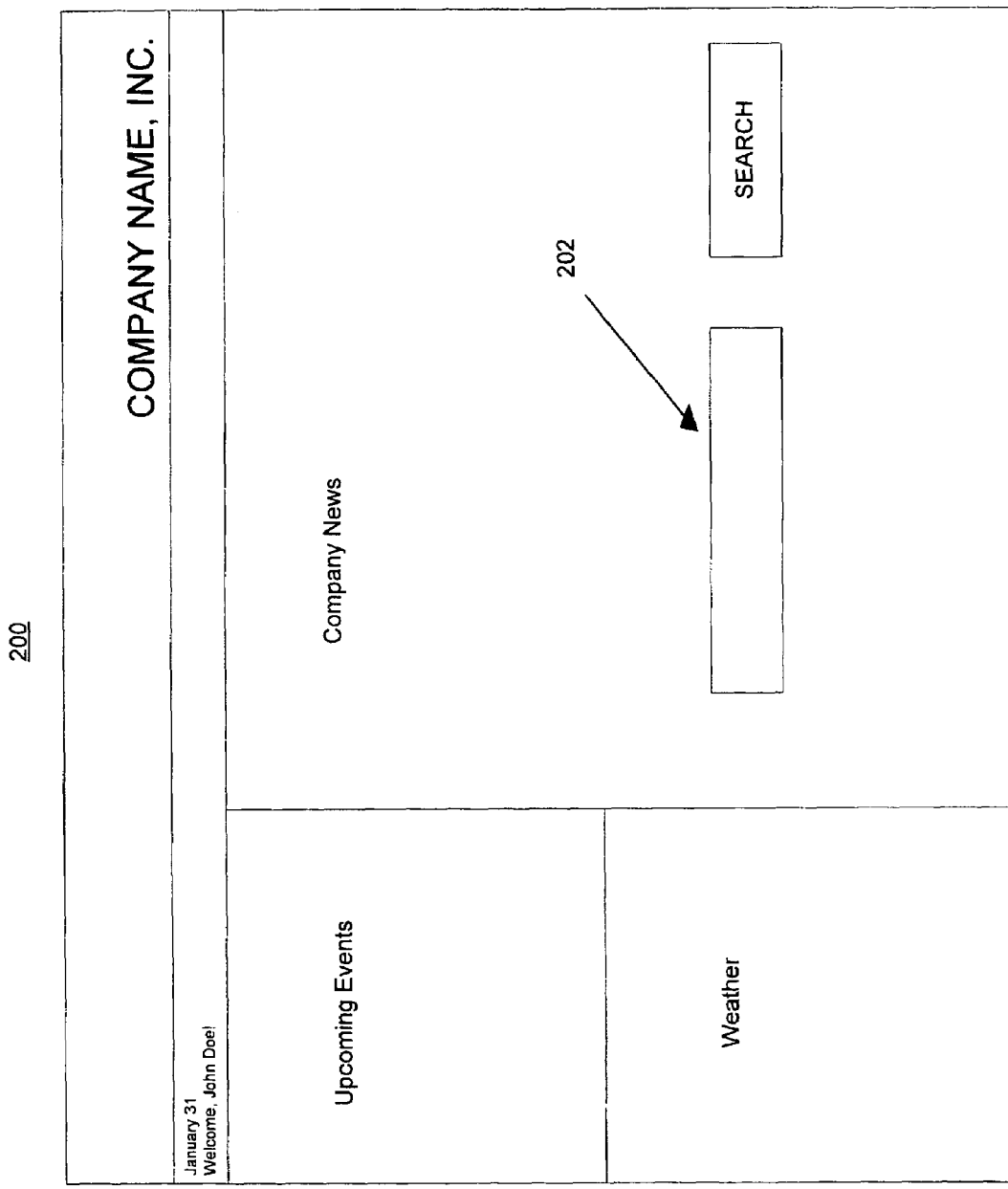
FIG. 2 illustrates a graphical user interface, according to an embodiment of the invention.

FIG. 2 illustrates an example of a portal page 200 having a search portlet 202 embedded therein. If a user enters a keyword search into search portlet 202 and does not have the system software for searching the local index stores on their workstation, the software may automatically be downloaded from server 112. The user may be presented with a dialog box where the user may be asked if they would like to install the system. Once the user has consented to install the components, the index and a control program are downloaded and installed. Once installed, the program may begin to create an index of documents the user has accessed by searching well known browser caches for web documents and/or intercepting calls to known productivity applications.

A desktop integration module may monitor predetermined events by retrieving content data and metadata from the applications used to access the documents. Metadata may refer to data describing an action taken by the user such as, for example, choosing a "document open" or a "document close" action. Metadata may also indicate the date and/or time a document was accessed. Content data may include data such as, for example, words found in the document, keywords stored with the document, a name of the document, an author of the document, and/or other content data. In some embodiments, keywords may be specified by the user when creating or modifying a document. In some embodiments, keywords may be determined by desktop integration module 104 based on the frequency of occurrence of certain words in the document.

Figure 3:
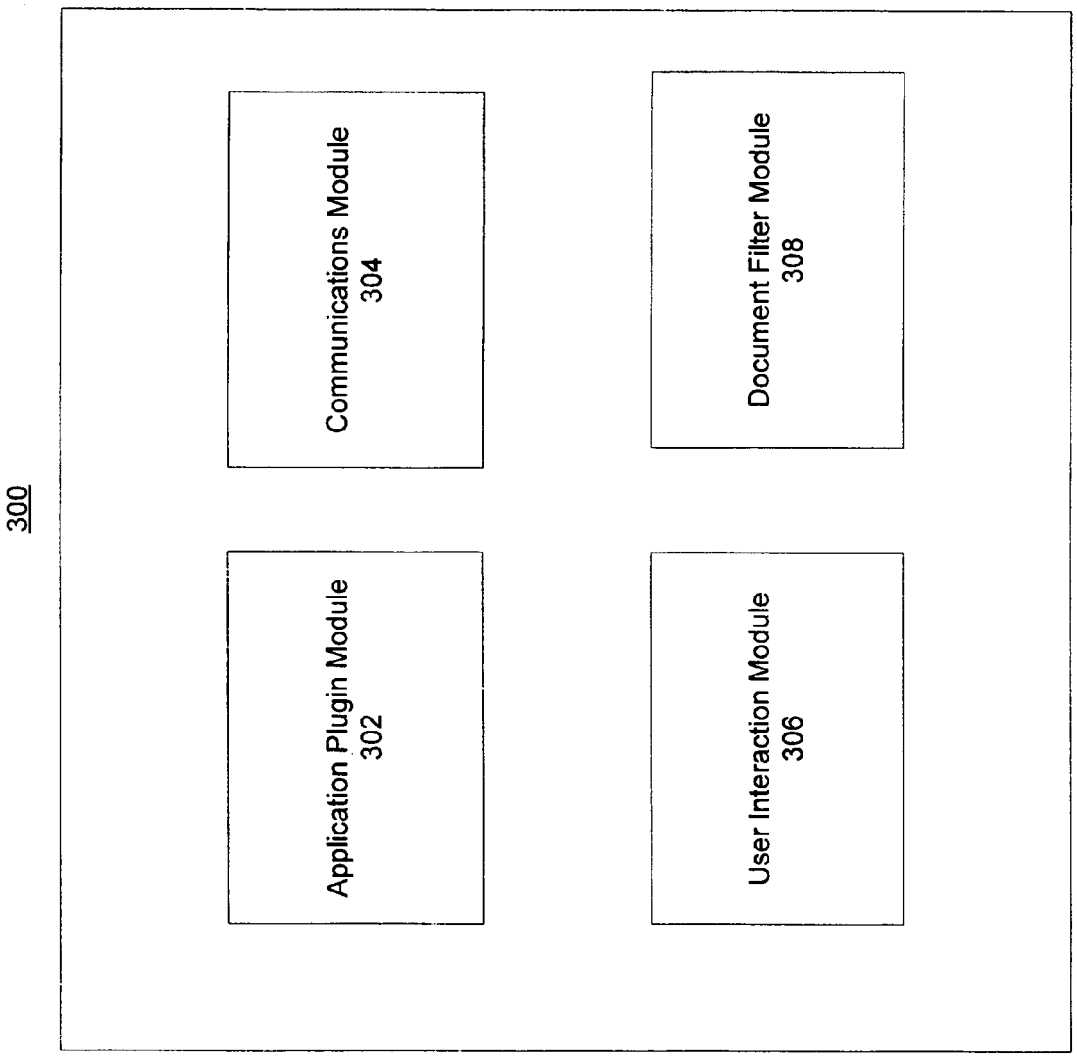
FIG. 3 illustrates a web portal having an embedded search field, according to an embodiment of the invention.

According to one embodiment of the invention, desktop integration module may include one or more subsystems. FIG. 3 illustrates desktop integration module 300, according to an embodiment of the invention. Desktop integration module 300 may include one or more modules such as, for example, an applications plugin module 302, a communications module 304, a user interaction module 306, a document filter module 308, and/or other modules.

Application plugin module 302 may include one or more stand alone modules which may be instantiated when an application matching a specified type is started by the user or an operating system at the user's terminal. Application plugin module 302 may extract information from documents such as, for example, the document type, content as text, author, size, creation date, and/or other document information. Application module 302 may also collect information related to a user's access of or interaction with a document, such as, for example, whether a user forwards an email or other document, edits a document, prints a document, and/or other user access.

Application plugin module 302 may be connected to communications module 304 through a standard plugin interface. Communications module 304 may submit documents being retrieved from application plugin module 302 to index module 106, enabling the documents to later be searched. Communications module 304 may convert documents into a format that can be readily indexed, such as, for example, from a binary .DOC format to a XML format.

User interaction module 306 may monitor an amount of time a document is accessed by the user. In some embodiments of the invention, user interaction module 306 may be integrated with the operating system used at the user's terminal to track the duration of a user's access of a document. For example, in a Microsoft Windows operating environment, Windows application programming interfaces, which may register file open and close operation, may be used to track the duration of a user's access of a document.

In some embodiments of the invention, some documents need not be tracked and indexed by the system. Document filters module 308 may be used to filter out documents that should not be tracked by the system. A user may define filters based on a number of factors such as, for example, document type, uniform resource identifiers (URIs), and/or other factors. For example, documents in the Microsoft Money application format may have personal financial information, so a user may wish to define a filter for excluding these documents from the index. Documents having URIs known to contain personal information such as, for example, "c:\Document Settings\User\Personal", or documents having URIs beginning with "https:\\" may be omitted. A user may also define filters for documents that are commonly accessed, such as a default browser homepage, or a search engine such as Google. Plugin specific filters may also be defined for omitting documents, such as emails from certain addresses, from being indexed.

Figure 4:
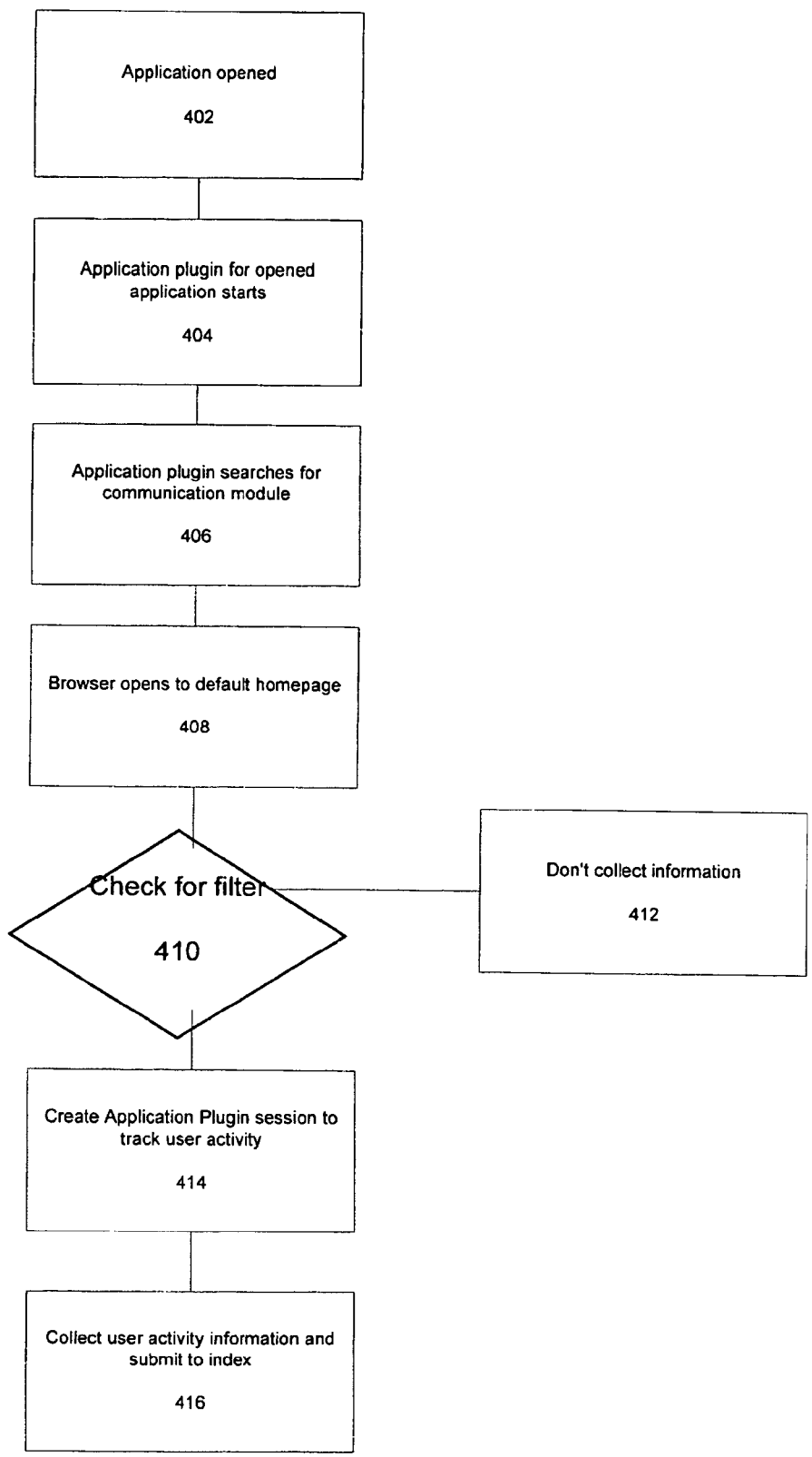
FIG. 4 is a flowchart illustrating an operation of a desktop integration module, according to an embodiment of the invention.

FIG. 4 illustrates an example of the operation of desktop integration module 300. At an operation 402, an application, such as, for example, Internet Explorer, may be started by a user. The user may click on the Internet Explorer icon to start up the browser. At an operation 404, an application plugin specific for Internet Explorer may start up. The application plugin may search for a communications module, or start a new singleton process, at an operation 406. At an operation 408, the browser may open up to a default homepage. The application plugin would then perform a filter check on the homepage URI to determine if the homepage is one that should not be indexed, as illustrated at an operation 410. As illustrated at an operation 412, if a filter has been set up for the current URI, no information is gathered, and no index entry is created. If no filter has been set up for the URI, an application plugin session may be created to track user activity, as illustrated at an operation 414. At an operation 416, user activity information may be collected and submitted to an index module.

Figure 5:
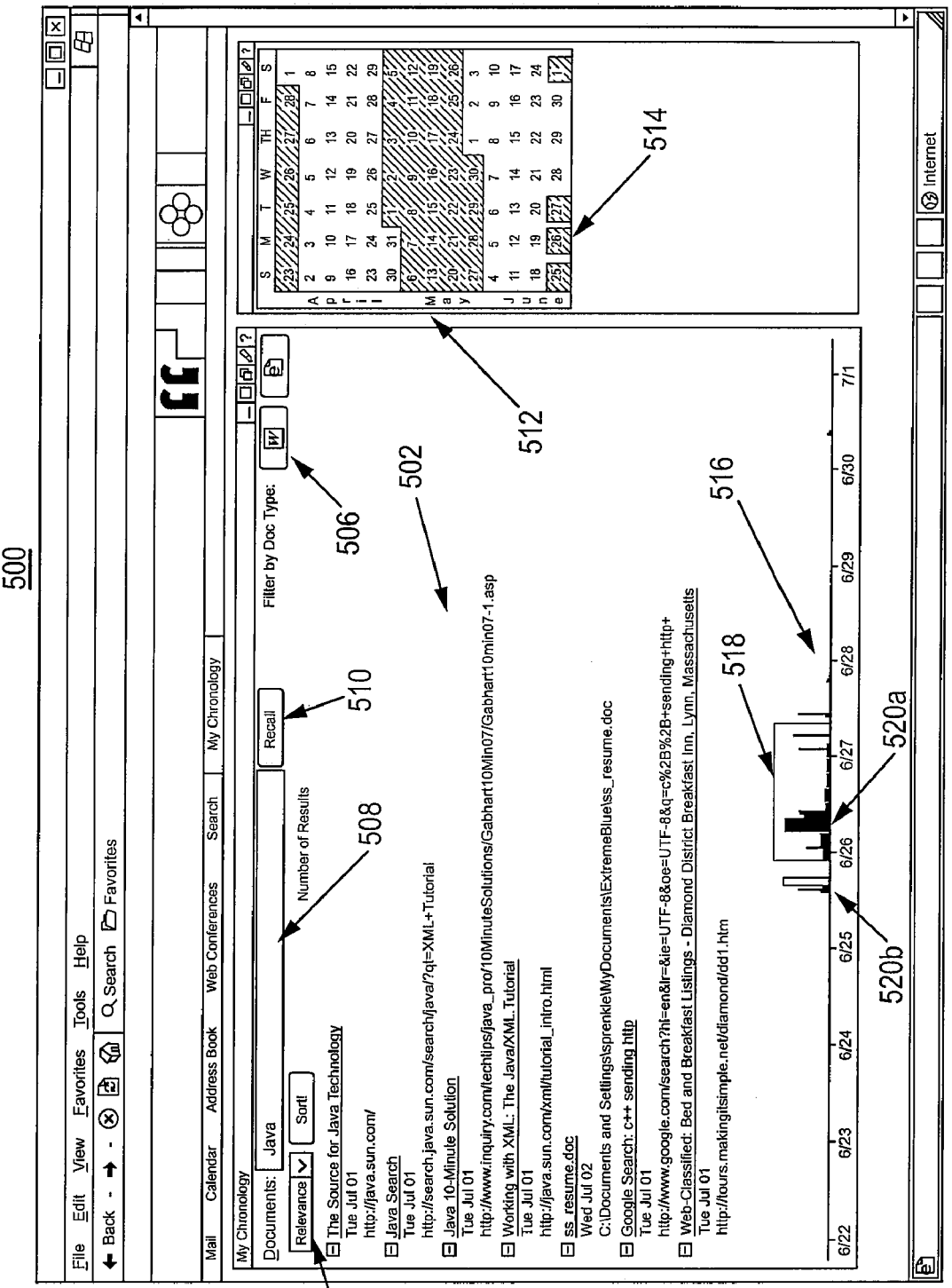
FIG. 5 illustrates a graphical user interface, according to one embodiment of the invention.

According to one embodiment of the invention, graphical user interface module 108 may provide a graphical user interface for displaying search results and enabling a user to enter additional search criteria. FIG. 5 illustrates a graphical user interface 500, according to one embodiment of the invention. Following an initial keyword search execution via portlet 202, GUI 500 may be presented having results set 502. Results displayed in results set 502 may be sorted in various ways such as, for example, by relevance, document type, alphabetically, chronologically, and/or other sorting methods. Sorting menu 504 may be provided, enabling a user to select a desired sorting method.

A user may choose to view only documents of a certain type by selecting one or more document type filters 506. Additional keywords may be entered or a new search may be executed by entering search terms into query box 508. Selecting recall button 510 may enable a search to be performed of all documents the user has previously accessed matching the search criteria.

In addition to standard search results displayed in search results box 502, various graphical visualizations may be provided. A calendar 512 may be provided. Calendar 512 may include indicia 514 indicating days on which documents from the search result set have been accessed. Indicia 514 may indicate the first time a user has accessed a document, or in other embodiments may indicate each access by the user. As illustrated in FIG. 5, indicia 514 may include highlighting a particular calendar day or days. Other visual indicators may be used, as would be apparent. A user may restrict results displayed in search results box 502 by selecting one or more dates from calendar 512. Results box 502 entries may then be limited to documents which have been accessed on the selected dates.

A histogram 516 may be provided for controlling the result set in a similar manner to calendar 512. A user may select either end of bounding box 518 to dynamically revise the result set, showing only those results within the selected date range. Histogram 516 may illustrate documents matching the search query in addition to all documents accessed by the user, allowing the user to see which documents were used within which sequence. For example, dark colored vertical lines 520a may indicate documents that match the search criteria, while light colored vertical lines 520b may indicate all other documents the user has accessed. Other visual indications may be used, as would be apparent.

Figure 6:
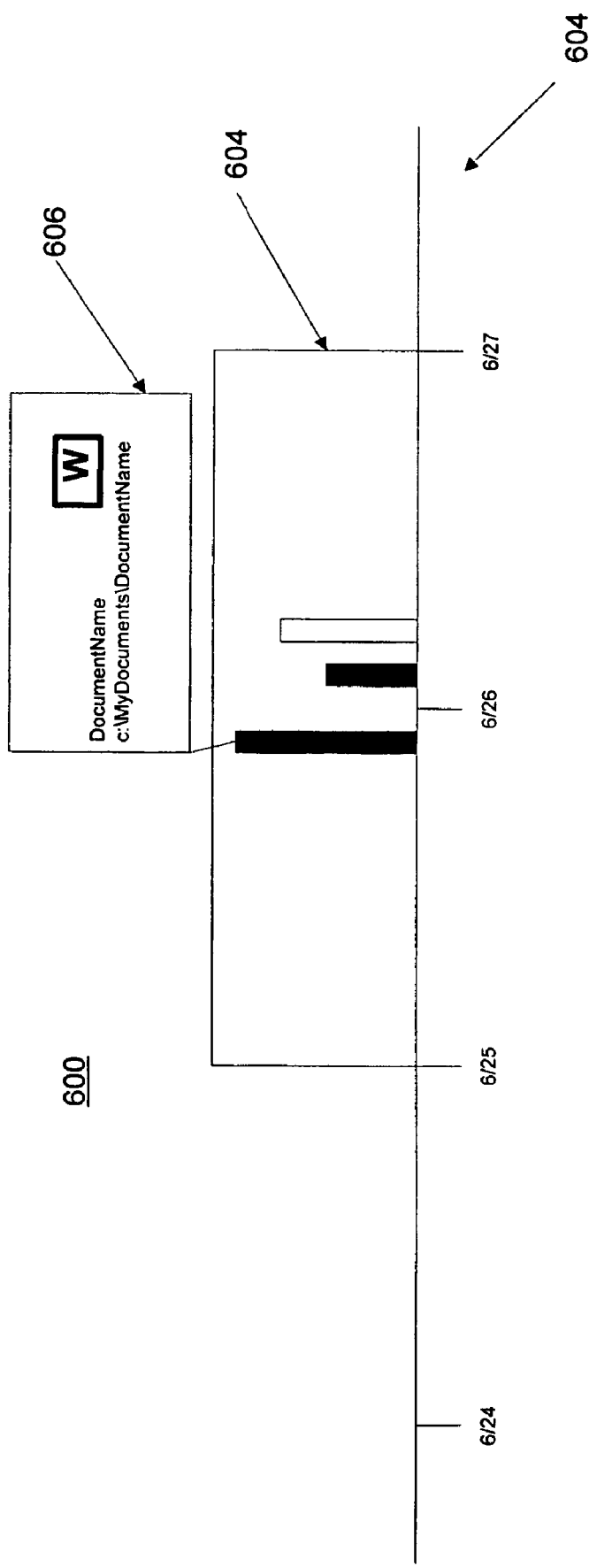
FIG. 6 illustrates a chronology histogram, according to an embodiment of the invention.

According to an embodiment of the invention, a user may retrieve a chronological display of document usage. FIG. 6 illustrates a chronology histogram 600, according to this embodiment of the invention. Chronology histogram 600 may be provided wherein both results set documents and other used documents are shown as vertical bars on a horizontal timeline. Horizontal timeline 602 provides a date range for which chronology information may be obtained. This date range may be extended by selecting and dragging the ends of bounding box 604 outward. The date range may also be contracted by dragging the ends of bounding box 604 inward.

In addition to the timeline on the horizontal axis, the height of each bar may provide additional information to the user about a document. The height of vertical lines may indicate the relevance of each document to the search query. In an alternative embodiment, the height of the vertical lines may indicate a specific usage pattern such as, for example, the amount of time spent working in a specific document. A user's usage activity may be recorded by Desktop Integration Module (shown in FIG. 1) and this information may be normalized to display a usage summary on chronology histogram 600.

Selecting a vertical line may open the selected document directly. In other embodiments, selecting a vertical line may cause a popup window 606 to be displayed. Pop-up window 606 may display a result set summary for the selected document. Summary information displayed in popup window 606 may include, for example, the document name, document location, document type, a summary of the document content, and/or other document related information.

Figure 7:
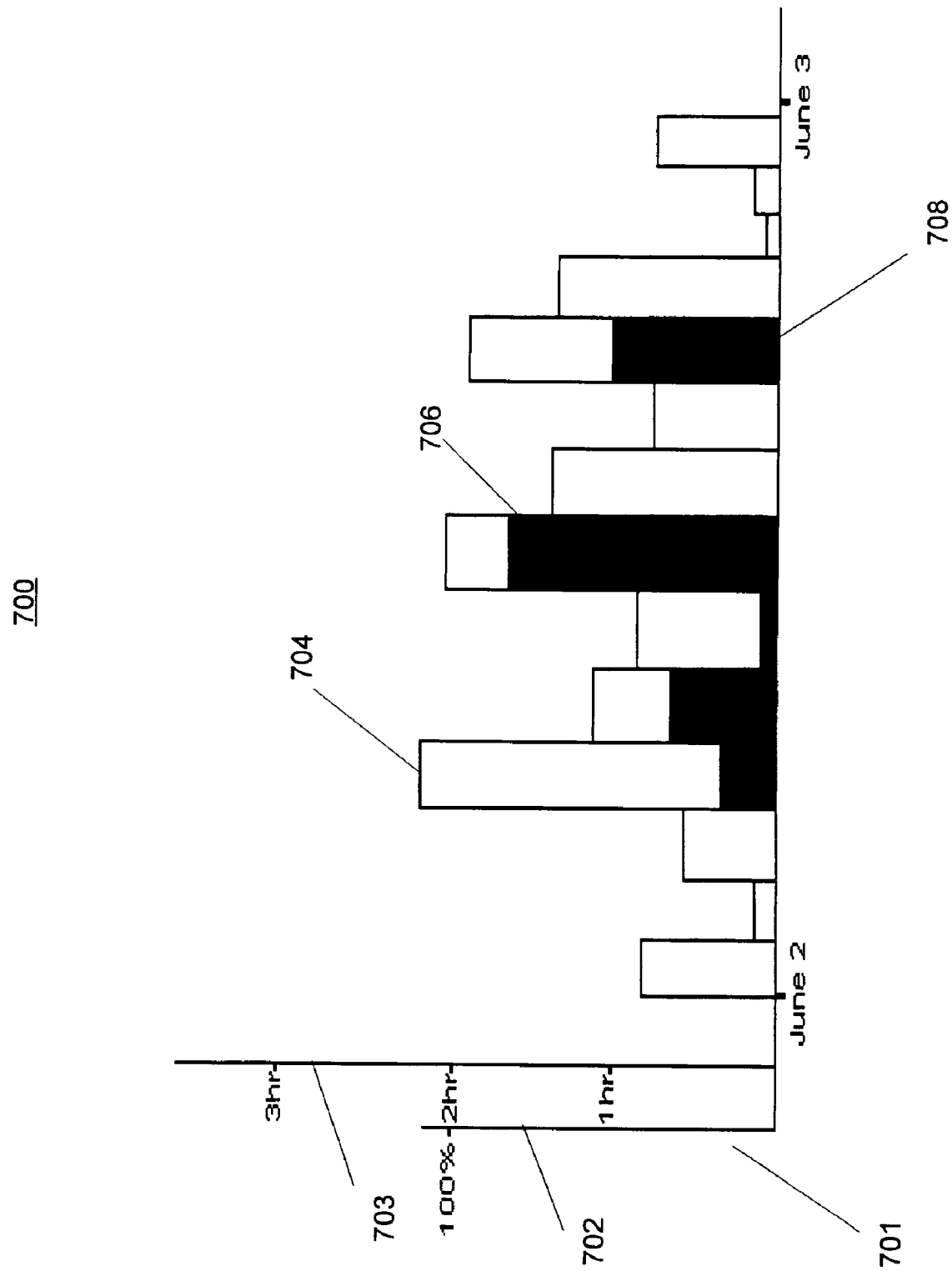
FIG. 7 illustrates another chronology histogram, according to an embodiment of the invention.

According to one aspect of the invention, multiple variables may be characterized on the vertical axis of a chronology histogram. FIG. 7 illustrates a chronology histogram 700, according to this embodiment of the invention. Displaying multiple variables may enable a user to quickly and efficiently locate a desire document. As illustrated, chronology histogram 700 displays both relevance of search results documents to the entered keywords as well as the amount of time spent accessing or interacting with the document. Other document characteristics may be displayed such as, for example, the number of hits.

Vertical axis 701 may provide multiple variables such as, for example, a relevance variable 702 and a duration variable 703. White boxes 704 may be provided to illustrate the time a user has spent on a document. This time may be illustrated for all documents a user has accessed, whether or not a particular document matches the search criteria. Shaded boxes 706 may indicate the relevance of one or more documents matching the criteria. Horizontal axis 708 may indicate one or more dates a document was accessed. Horizontal axis 708 may also indicate, chronologically, the order in which a document was accessed. In some embodiments of the invention, horizontal axis 708 may provide a time display, indicating the time interval in which a document was accessed.

According to one aspect of the invention, relevance calculations for search results are enhanced for a specific user by collecting user metrics during the user's interaction with the document. In addition to ranking documents based on the frequency and location of keyword hits and the proximity of query keyword hits to each other, the invention may collect metadata using desktop integration module 104 (illustrated in FIG. 1). Collected metadata may include, for example, the amount of time spent on a document, how often a document has been viewed, or otherwise accessed, whether or not the document was printed or emailed, and/or other document related actions.

Certain criteria may be required in order to determine the amount of time a user has spent interacting with a document. For example, it may be a requirement that the user has the document open and in focus. In focus may refer to having the selected document as the active window when multiple documents and/or applications are open. A user may be required to perform some type of input/output operation within a predetermined time interval in order for time calculation to continue. For example, the input/output operation may be a keystroke or mouse movement.

Once the criteria have been satisfied, the collected metadata may be entered into the index using index module 106 (illustrated in FIG. 1). Opening a document multiple times may cause metadata to be obtained for both frequency and duration of use. For example, a document that has been opened three times may show a frequency of three, and the total amount of time spent among the three accesses may be combined to calculate the amount of time the user has spent on the document.

According to another aspect of the invention, metrics regarding a user's interaction with one or more documents may be presented to the user on a graphical user interface. Presenting user metrics to the user may enable the user to more readily distinguish between documents in the result set and simplify the process of finding the desired document.

Figure 8:
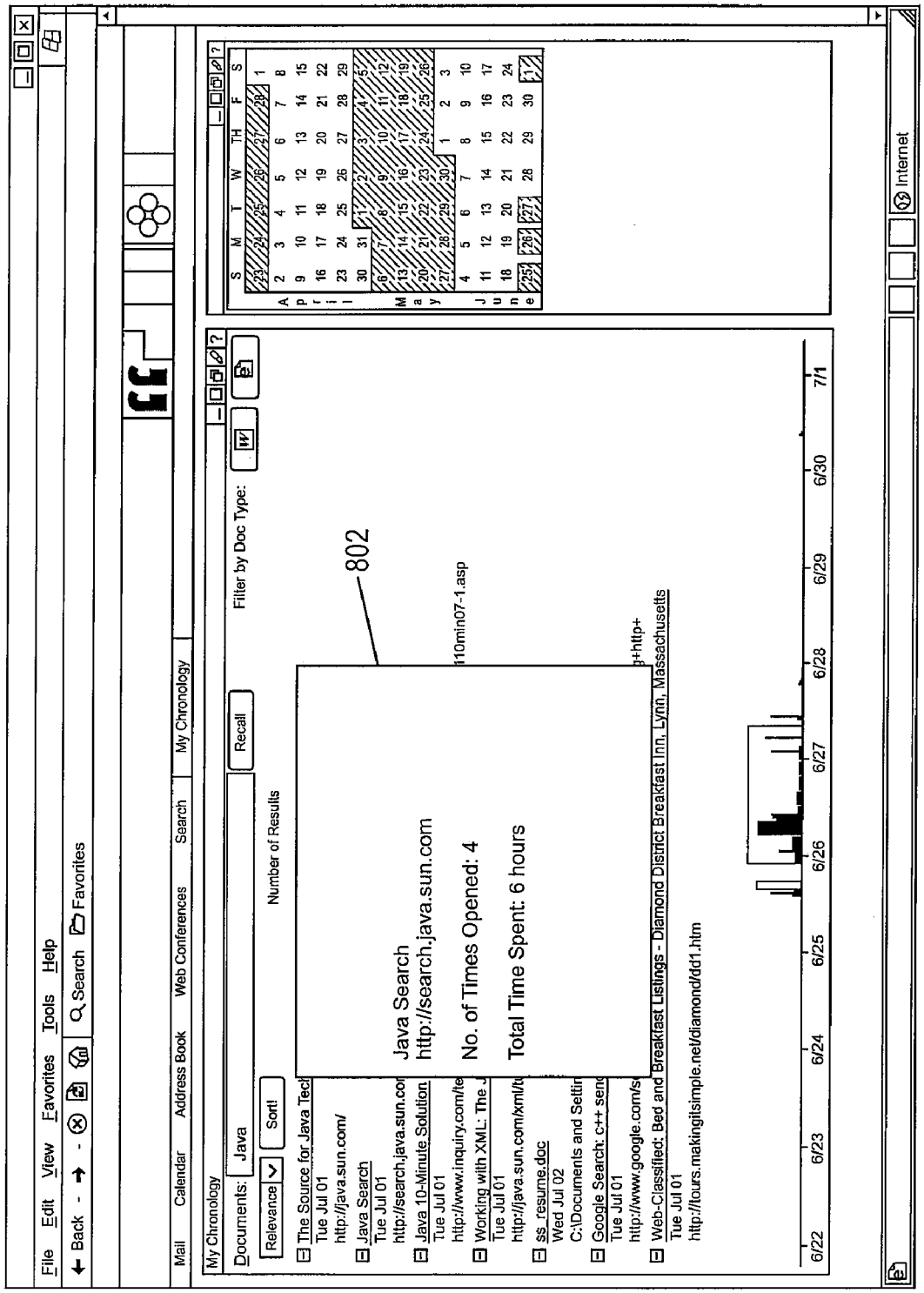
FIG. 8 illustrates a graphical user interface, according to an embodiment of the invention.

In some embodiments of the invention, a user may trigger the user interface to present user metrics by performing an action such as, for example, right-clicking on the document in the result set. A pop-up window 802 may be provided, as illustrated in FIG. 8. Pop-up window 802 may display, for example, document name, document location, the number of times the document has been opened by the user, the total amount of time the user has spent on the document, and/or other user metrics.

Figure 9:
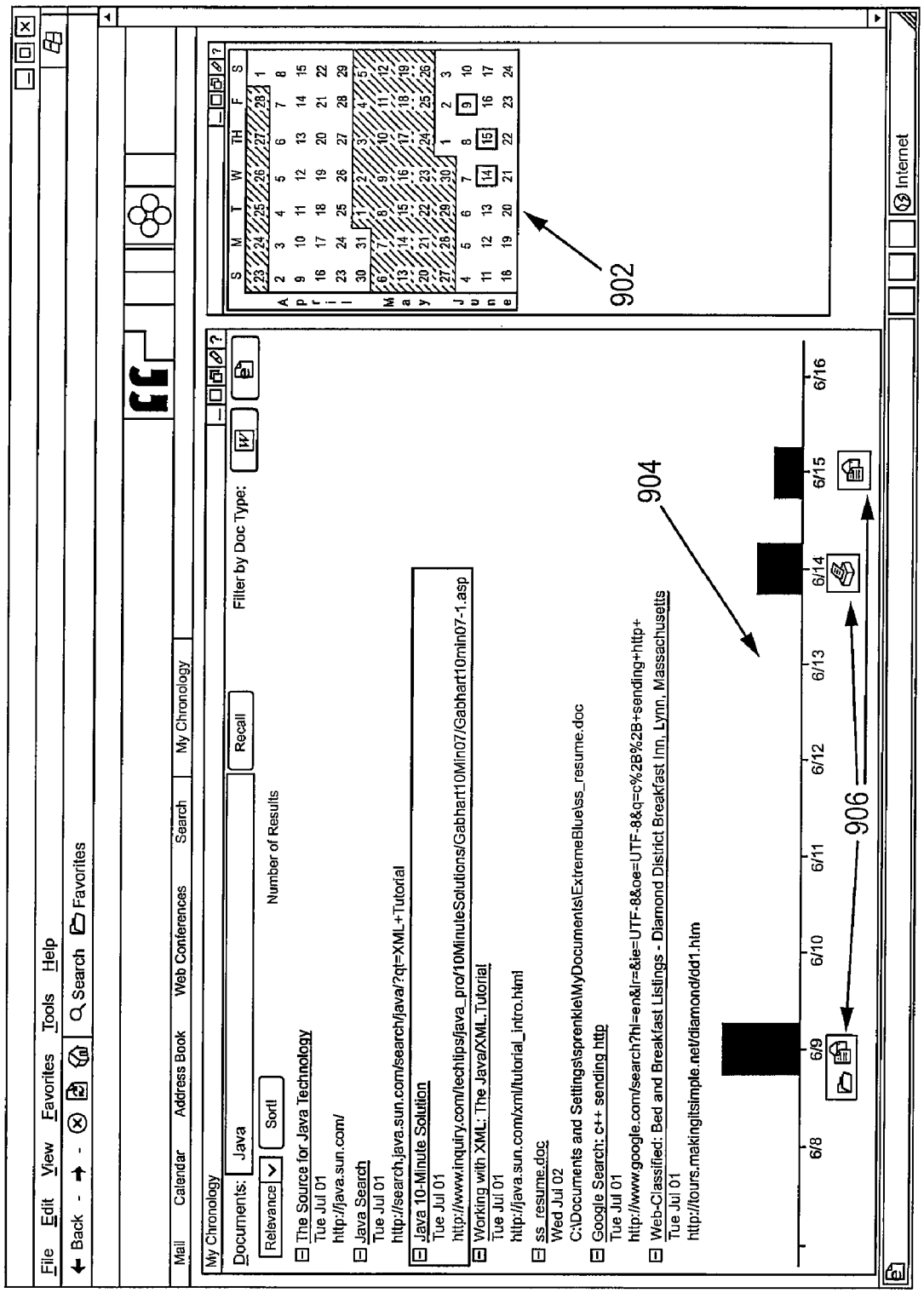
FIG. 9 illustrates a graphical user interface, according to an embodiment of the invention.

In some embodiments of the invention, user metrics may be displayed when a user hovers over a document in the result set. Hovering over a document may cause a change in the calendar and/or histogram graphical representations. For example, as illustrated in FIG. 9, calendar 902 may highlight days on which the selected document has been accessed. Histogram 904 may provide additional user metrics. For example, the x-axis of histogram 904 may display the dates in which the user accessed the selected document, while the y-axis illustrates the amount of time the user spent on the document. Small icons, such as icons 906, may be presented on histogram 904, indicating the amount of time the user spent on the document. Other icons may also be presented, for example, a printer icon, book icon, and/or envelope icon may be presented to indicate that the user has printed, read, and/or emailed the document, respectively. Other icons may be presented indicating editing of a document, forwarding, replying, and/or other document related actions, as would be apparent.

While certain actions have been described above, other actions may be used to present user metrics to the user. For example, a user may single click on a document to change the views of the histogram and calendar, or the user may double click on a document to open a new window providing user statistics.

According to an embodiment of the invention, user metrics may be provided directly in the results set without requiring additional actions to be performed. FIG. 10 illustrates a result set 1000 which provides user metrics. User metrics illustrated in result set 1000 may include, for example, the total viewing time for each document, the amount of time the document was viewed, and the date the document was last accessed. Other user metrics may be provided, as would be apparent.

According to another aspect of the invention, the system may be integrated into a user's email and calendar application. A user may quickly obtain documents relevant to a particular email message or calendar entry. A user interface for searching based on a user's email and calendar entries may be integrated with the email applications in some embodiments, or may be a standalone application.

Figure 11:
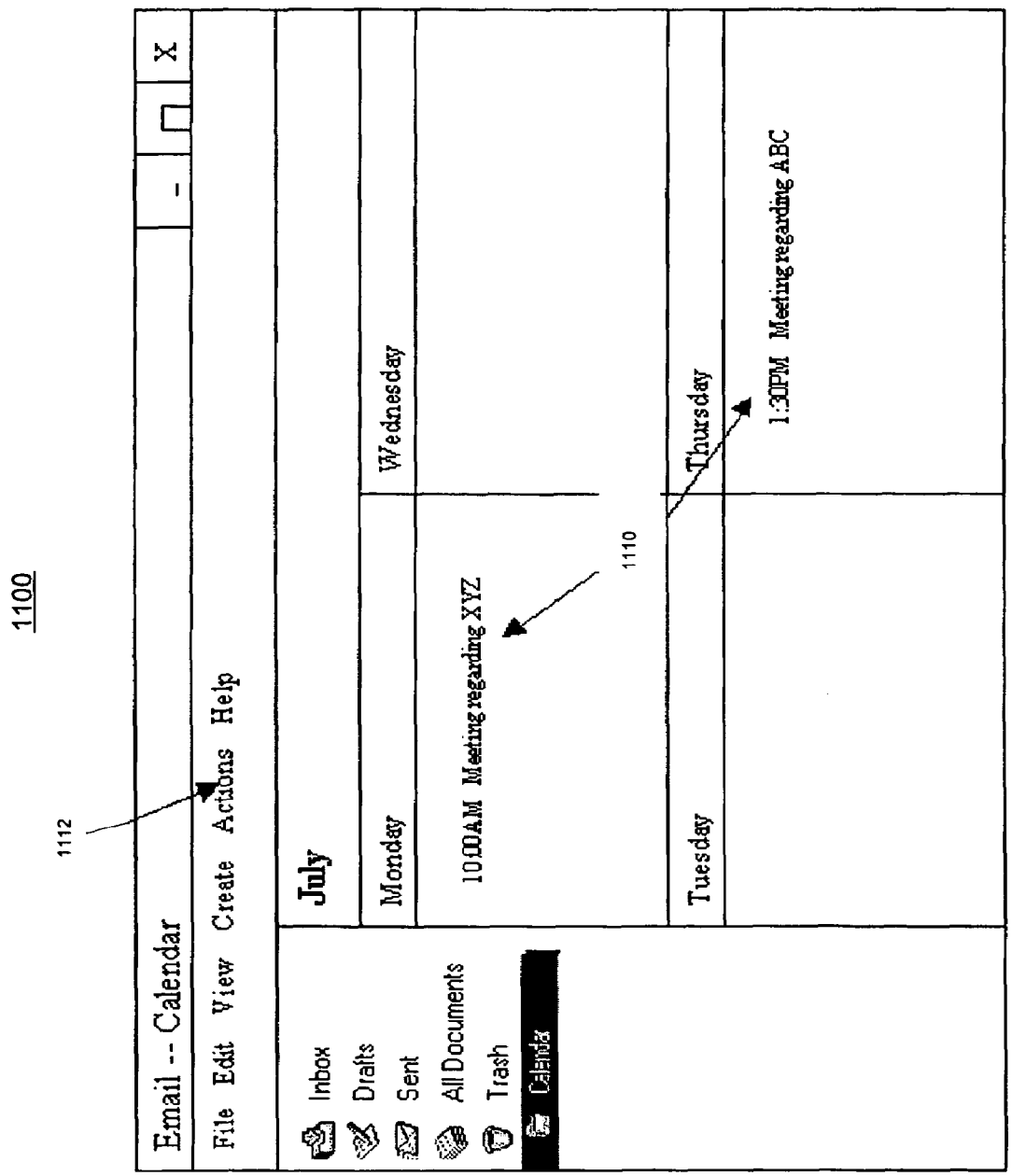
FIG. 11 illustrates a calendar view from an email program, according to an embodiment of the invention.

FIG. 11 illustrates an example of a calendar view 1100 associated with an email program such as, for example, Lotus Notes. As illustrated, several meetings 1110 are listed on calendar 1100. A user wishing to view documents related to a scheduled meeting may do so by selecting the meeting and choosing an option to search for related documents. Options may be provided by various ways, such as, for example, "right-clicking" on a meeting to bring up a pop-up menu, choosing an option from Actions menu 1112, or other methods as would be apparent. Search criteria may also be created from an email message. Search criteria may include, for example, the title of the meeting, subject of the email message, keywords from the body of an email message, names of meeting invitees, and/or other criteria.

Desktop integration module 102 may obtain content and metadata from calendar 1100 regarding the selected meeting. Indexing module 104 may use the retrieved metadata and content data and compare it to the indexed data for all stored documents. Documents having matching content data and/or metadata may be returned as being related to the selected meeting. In other embodiments, authors of documents may associate the document with certain meetings. In some embodiments of the invention, only documents accessed on the day of the meeting are retrieved while in other embodiments, all accessed documents related to the meeting are returned.

Once the user has been presented with search results, the user may modify the search to more quickly find desired documents. For example, the user may input additional keywords, use document type filters to return only documents of certain types, restrict the search to one or more dates, and/or other search modifications.

According to another aspect of the invention, a system may be provided, enabling a user to search a local workstation from a remote portal location. As used herein, local workstation may refer to the workstation that is assigned to a particular user and from which the user typically works. A user may have access to documents stored on their local device and may be able to integrate these documents into a portal integration environment.

Figure 12:
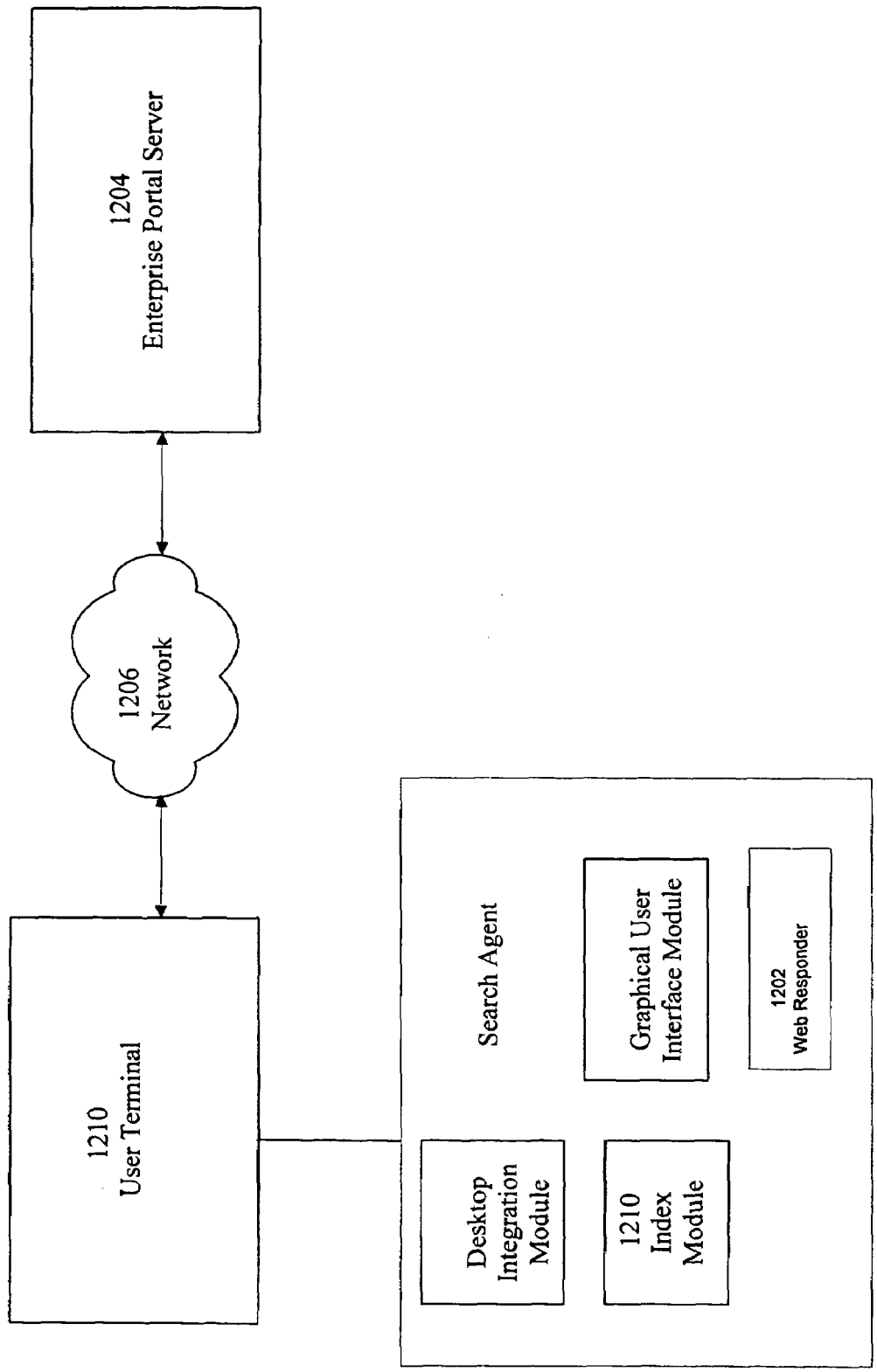
FIG. 12 is a block diagram of a system for searching from a remote portal, according to an embodiment of the invention.

As described above, in some embodiments of the invention, an index and control program may be downloaded to a user's workstation the first time a query is made using the portlet. In addition to the index and control programs, a web responder may also be installed. FIG. 12 illustrates a block diagram 1200 of the system including web responder 1202. In some embodiments of the invention, web responder 1202 listens for inbound queries from Enterprise Portal Server 1204 over network 1206. Once web responder 1202 has been installed, queries from Enterprise Portal Server 1204 may be accepted at user terminal 1210.

A user may perform a search from Enterprise Portal Server 1204 in a manner similar to performing a local search. The user may enter a search query into a portal page, such as the portal illustrated in FIG. 2. The query may then be sent to the local workstation where the web responder has been installed. An index at user terminal 1210 may then process the query and return the results in a format supported by Enterprise Portal Server 1204, such as, for example, the XML format. Results may then be formatted and presented to the user.

According to one embodiment of the invention, searching a local workstation index may be performed as a part of a search from another application. For example, a single search may be used to search a user's workstation, email documents, and/or a corporate document management system using a search engine integrated with the document management system. Search results may be combined into one display. In an alternative embodiment, only the user's own documents are searched using the index at the user's workstation.

While particular embodiments of the invention have been described, it is to be understood that modifications will be apparent to those skilled in the art without departing from the spirit of the invention. The scope of the invention is not limited to the specific embodiments described herein. Other embodiments, uses and advantages of the invention will be apparent to those skilled in art from consideration of the specification and practice of the invention disclosed herein. The specification should be considered exemplary only, and the scope of the invention is accordingly intended to be limited by the following claims.

What is claimed is:

1. A network-implemented method of searching for one or more documents a user has previously accessed comprising:
    maintaining, on a workstation of a user, an index that includes one or more entries for only one or more documents the user has previously accessed;
    receiving an input from the user located at a remote location from the workstation for searching the index;
    locating one or more search results corresponding to said input;
    receiving at the remote location said one or more search results; and
    presenting said one or more search results to the user,
    wherein said one or more search results are presented in a graphical user interface having indicia indicating whether each one or more document in said one or more search results is accessible by the user at the remote location.

2. The method of claim 1 wherein receiving an input further comprises receiving a request from an application to search said index located on said workstation and at least one additional location.

3. A network-implemented method of responding to a search query received from a remote location, the method comprising:
    maintaining, on a workstation of a user, a local index that includes one or more entries for only one or more documents the user has previously accessed at the workstation;
    receiving a search query, wherein said search query is a request by a user located at the remote location to search said local index;
    locating one or more documents matching said search query;
    creating a list of said one or more matching documents, wherein said list is formatted in a common computer readable format; and
    responding to said query by providing said list of one or more matching documents to the remote location.

4. The method of claim 1 wherein maintaining the index comprises monitoring one or more of a plurality of documents previously accessed by the user for one or more predetermined events.

5. The method of claim 4 wherein said predetermined events include one or more of: creating a document, opening a document, closing a document, saving a document, or printing a document.

6. The method of claim 1 wherein receiving an input comprises enabling said user to enter one or more keywords to create a search query to be used to search said index.

7. The method of claim 1 further comprising converting said one or more search results into a common format.

8. The method of claim 7 wherein the common format is XML.

9. The method of claim 1 wherein an entry is created in the index for each previously accessed document by searching one or more browser caches and intercepting one or more calls to access one or more applications.

10. The method of claim 1 wherein the workstation is connected to an enterprise portal server over a network.

11. The method of claim 1 further comprising presenting a calendar in the graphical user interface that enables the user to select one or more days that specify a time period within which said one or more documents were previously accessed by the user.

12. The method of claim 3 wherein maintaining the local index comprises monitoring one or more of a plurality of documents previously accessed by the user for one or more predetermined events.

13. The method of claim 12 wherein said predetermined events include one or more of: creating a document, opening a document, closing a document, saving a document, or printing a document.

14. The method of claim 3 wherein the common computer readable format is XML.

15. The method of claim 3 wherein an entry is created in the local index for each previously accessed document by searching one or more browser caches and intercepting one or more calls to access one or more applications.

16. The method of claim 3 wherein the workstation is connected to an enterprise portal server over a network.

17. The method of claim 3 further comprising presenting a calendar that enables the user to select one or more days that specify a time period within which said one or more documents were previously accessed by the user.

18. The method of claim 3 further comprising presenting a sorting menu enabling said one or more documents matching said search criteria to be sorted and displayed according to one or more of: relevance, document type, alphabetical order, or chronological order.

* * * * *